Oct. 4, 1949.  A. E. MORREY, JR  2,483,923
VERTICAL TYPE INTERNAL OUTLET
HEADER FOR CATALYST CHAMBERS
Filed Oct. 3, 1947  2 Sheets-Sheet 1

INVENTOR.
A.E. MORREY, JR.
BY Hudson and Young
ATTORNEYS

Oct. 4, 1949.  A. E. MORREY, JR  2,483,923
VERTICAL TYPE INTERNAL OUTLET
HEADER FOR CATALYST CHAMBERS

Filed Oct. 3, 1947  2 Sheets-Sheet 2

INVENTOR.
A.E. MORREY, JR.
BY Hudson and Young
ATTORNEYS

Patented Oct. 4, 1949

2,483,923

UNITED STATES PATENT OFFICE 2,483,923

VERTICAL TYPE INTERNAL OUTLET HEADER FOR CATALYST CHAMBERS

Alfred E. Morrey, Jr., Sand Springs, Okla., assignor to Phillips Petroleum Company, a corporation of Delaware Application October 3, 1947, Serial No. 777,821

9 Claims. (Cl. 196—52)

This invention relates to an improved catalytic conversion chamber. In one of its more specific aspects it relates to an improved outlet header for a conversion chamber, containing a particulate solid catalyst and a method for operating a catalytic conversion chamber utilizing such a header.

In the operation of catalytic conversion systems utilizing a particulate solid catalyst, considerable difficulty has been encountered in that the particles of catalyst tend to become covered with depositions of carbonaceous materials. Catalytic conversion chambers are usually insulated on either the inside or outside of the conversion chamber shell or both. This, however, does not sufficiently prevent heat loss so that the catalyst in the outer periphery of the catalyst bed will not be somewhat cooler than that portion of the catalyst in the center of the bed. Because of the higher temperature in the center of the chamber, carbonaceous deposits in the center of the conversion chamber tend to be heavier than those occurring near the periphery of the catalyst bed. This carbonaceous material must periodically be removed in order to return the catalyst material to a more active state. Many methods have been utilized in regenerating particulate solid catalysts but one of the most successful methods has been to pass pre-heated oxygen or air through the catalyst bed to convert the carbon to carbon dioxide. Inasmuch as this reaction is exothermic, steam is frequently injected with the regeneration gas to absorb heat of reaction and thus lower or control the temperature within the catalyst chamber. In this manner the temperature is substantially controlled and damaging of the catalyst material is prevented. This type of regeneration operation has proved only partially successful, however. It has been found that though the regeneration tends to be uniform across the catalyst bed for a short distance through the catalyst chamber, it then appears to progress more rapidly in that portion of the bed near the periphery of the chamber. This is undoubtedly due to the fact that that portion of the catalyst bed, as pointed out, tends to contain less carbon, because of its commonly lower temperature, than the catalyst contained in the center of the bed. The result has been that the catalyst has been regenerated more rapidly near the bed periphery and breakthroughs of the regenerating material tend to occur along the outer periphery of the bed while the lower center portion is still substantially unregenerated. The net result is, therefore, that though the regeneration has been carried on until only a small percentage of the carbon products are included in the effluent from the conversion chamber, e. g. 2% carbon dioxide, a portion of the carbon-bearing catalyst, often a cone-shaped mass, projecting upwardly into the center of the catalyst bed, remains unregenerated. As alternate conversion and regeneration steps are carried out the amount of carbon in the center portion of the catalyst bed becomes heavier because of additional carbonaceous deposits on the already carbon bearing catalyst. The carbon cone becomes larger with the continued deposition thus inactivating an increased amount of catalyst bed.

Another cause for trouble in many catalytic conversion operations is the substantial solidification of the lower portion of the catalyst bed. Ordinarily particulate solid catalyst is prepared by crushing and screening to provide particles of a desired size which will give the best catalyst contact surface. The catalyst may also be in other than crushed form, such as pellets, extrusions, etc. During the operation of a conversion chamber, fine particles of the catalyst will be broken from the larger pieces of material and will be carried downwardly through the catalyst bed by the reactant materials. Those fine particles tend to pack, with the larger particles, in the lower portion of the conversion chamber, substantially filling the void spaces between the larger particles, seriously retarding the flow of materials therethrough, and increasing the pressure drop through the chamber.

An object of this invention is to substantially reduce the formation of a carbon cone in a catalytic conversion chamber.

Another object of the invention is to remove catalyst fines from a catalyst bed efficiently and economically when such fines interfere with the conversion process.

Still another object of the invention is to provide a method for carrying out a conversion more evenly throughout a conversion chamber.

A further object is to make possible the more complete regeneration of particulate solid catalyst material in a conversion chamber.

Other and more detailed objects of the invention will be apparent from the accompanying drawing and description.

Figure 1:
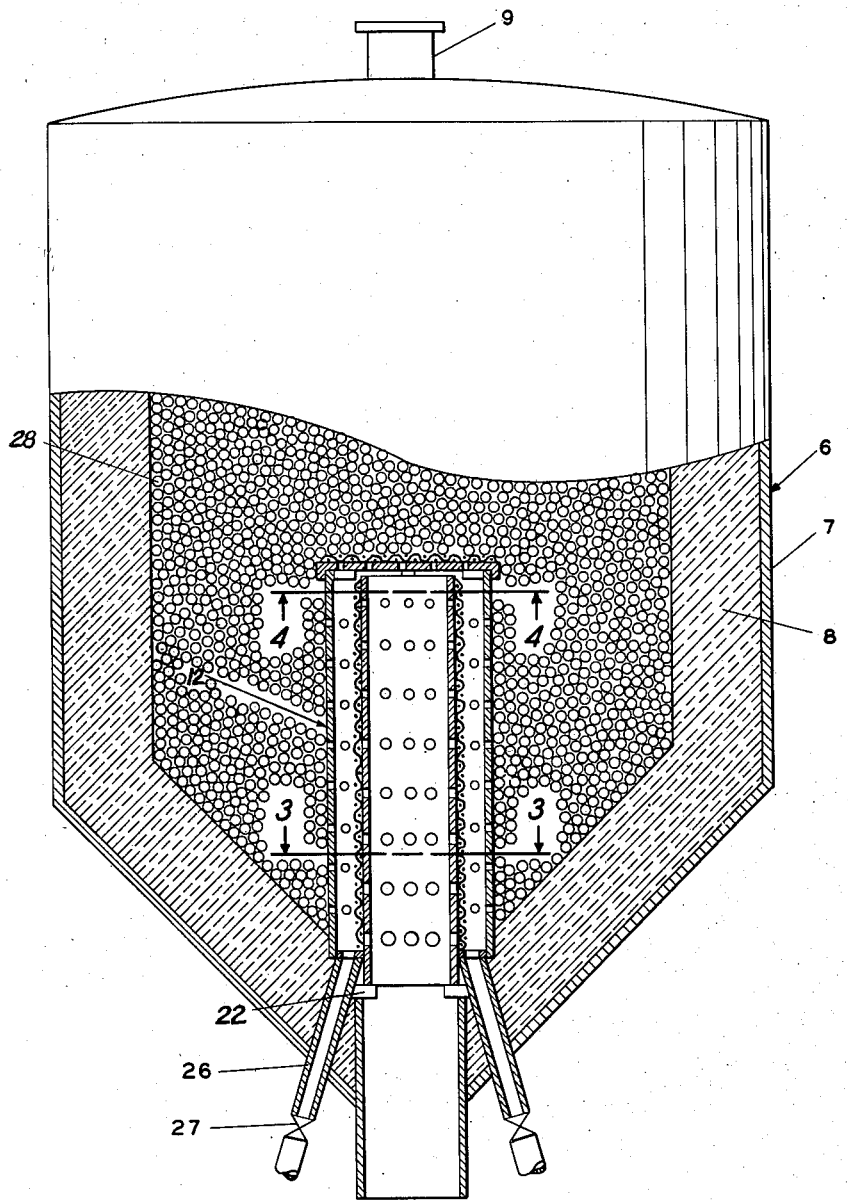
Figure 1 is a vertical partial cross sectional view of a catalytic conversion chamber disclosing a preferred embodiment of the invention.
Figure 2:
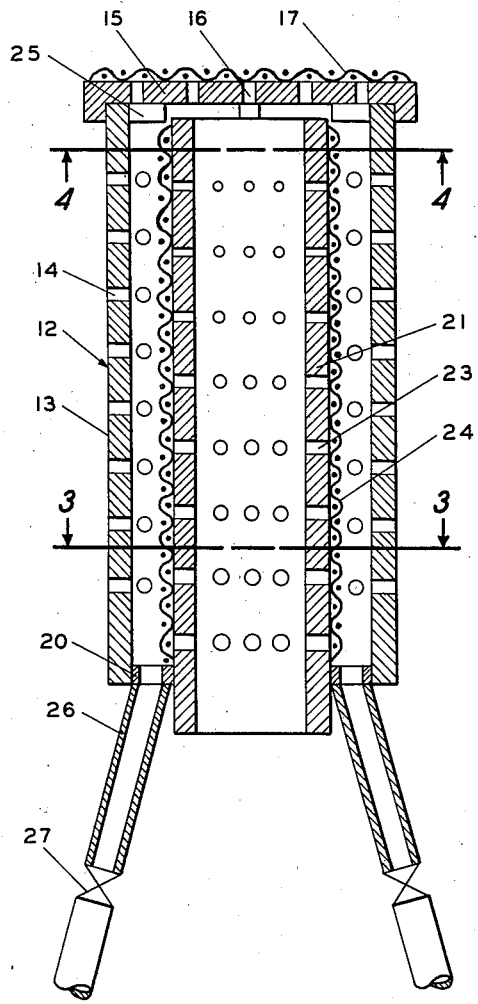
Figure 2 is a vertical cross sectional view of a preferred embodiment of the outlet header of this invention.
Figure 3:
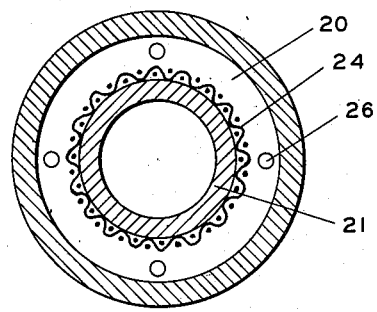
Figure 3 is a horizontal sectional view taken along line 3—3 of Figure 2.
Figure 4:
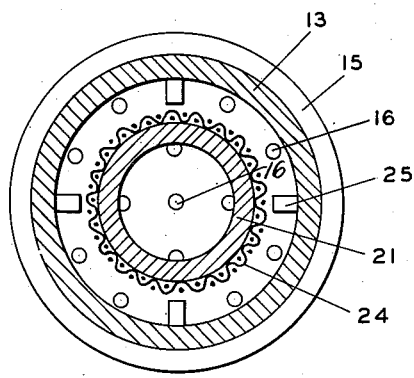
Figure 4 is a horizontal cross sectional view taken along line 4—4 of Figure 2.

In Figure 1 of the drawing, catalytic conversion chamber 6 comprises an outer shell 7 having a form retaining insulation lining 8 on its interior surface. Inlet 9 is provided in the top of the chamber for the purpose of introducing reactant materials into the chamber. The bottom portion of the conversion chamber is preferably conical in shape. Figure 2 of the drawing is an enlarged view which shows with considerable particularity outlet header 12, which comprises in combination, an outer chamber 13, having substantially equal size perforations 14 distributed over the area of its walls. This chamber as shown in Figure 1 is positioned so that its bottom end rests upon the bottom of conversion chamber 6 and the outlet chamber extends upwardly, substantially coaxially with and into the conversion chamber. A catalyst support, such as cap 15, is provided to close off the upper end of chamber 13. Cap 15 has a plurality of perforations 16 therein, which perforations may be substantially equal in size to perforations 14 in chamber 13, and perforations 16 are provided with filter means such as fine mesh, heat resistant screen 17. Inner chamber 21 is open at both ends and extends coaxially with and into outer chamber 13 to a point at which the upper end of chamber 21 is nearly adjacent to or spaced from cap 15 by only a small distance. Chamber 21 may be, as is shown in Figure 1, supported at its lower end by lugs 22 in the bottom of the conversion chamber. Inner chamber 21 is provided with perforations 23 which are distributed over the area of its walls and which perforations increase in size from the top of said inner chamber to a point within the bottom portion of said outer chamber 13. Perforations 23 are provided with filter means, such as fine mesh, heat resistant screen 24. Chamber 21 is spaced, at its upper end, from outer chamber 13 by spacer means 25 and may be spaced at its lower end, by a bottom place 20 or form retaining insulation 8. Outlet means 26 are provided in the bottom of outlet header 12 or conversion chamber 6 and communicate between the annular space, formed between outer chamber 13 and inner chamber 21, and the exterior of header 12 or conversion chamber 6. Closure means 27 are provided in outlet means 26 to control flow therethrough. A large stationary mass of a particulate solid catalyst material 28 is provided in the interior of catalytic conversion chamber 6 substantially filling the space within the chamber formed by insulating material 8, and surrounding outlet header 12. This catalyst material may be any clay type catalyst material such as Florida earth, bauxite, synthetic silica-alumina, acid treated clays, and the like, which may provide the desired catalytic effect or may be one of the above which may be impregnated with other materials which will produce additional catalytic qualities. The particles of catalyst material should be at least slightly larger than the size of perforations 14.

The filter means, such as fine mesh, heat resistant screens 17 and 24, may be attached to the portion of header which they protect by any conventional manner such as banding, spot welding, etc.

In the operation of the device diagrammatically disclosed in Figure 1, pre-heated reactant materials together with a diluent may be injected, under pressure, into the conversion zone, comprising the catalyst filled conversion chamber, through the chamber inlet. These materials pass downwardly through the bed of particulate solid catalyst material and a considerable portion of them is reacted therein. As the reactant materials pass downwardly through the outer periphery of the catalyst bed, they come in contact with the conical shaped bottom of the conversion chamber and are directed inwardly toward and into the outlet header, which header forms between its inner and outer chambers, a trapping zone. Those materials which pass downwardly through the center portion of the catalyst bed continue downwardly in the center portion through the filter means in the header cap by means of the perforations therein. Intermediate layers of reactant material are deflected inwardly by the inwardly directed outer layers of reactant materials. Normally the reaction effluent passes through the perforations in both the inner and outer chambers of the header and out of the conversion chamber through the bottom of the inner chamber. As the effluent materials enter the outer chamber of the outlet header through the perforations therein, fine particles of the catalyst material are carried thereinto by the effluent flow. These particles are, however, filtered from the effluent stream by filter means such as the heat resistant screen covering the perforations in the inner header chamber which filter means forms a separation zone. These particles tend to collect and settle in the trapping zone between outer chamber 13 and inner chamber 21 until a sufficiently dense mass has been built up in the area that an increased pressure drop across the conversion chamber occurs. A substantially even flow is maintained through the outlet header, while the fines are accumulating, because of the varied sized perforations in the inner chamber. The larger perforations are provided in that portion of the chamber which would be surrounded by the densest accumulation of catalyst particles. The reaction effluent which passes through the filter means in the perforations of the inner header in turn passes out of the reaction chamber through the bottom of the inner header. When the pressure drop across the conversion chamber reaches a predetermined maximum, usually within the range of from 4 to 10 pounds, though it may be higher or lower, the closure means in the outlet means are opened so as to allow the effluent stream to blow catalyst fines downwardly within the space between the inner and outer outlet chamber and outwardly through the outlet means. When the pressure drop has diminished sufficiently the closure means are closed once again, allowing the total effluent stream to pass into and through the inner chamber of the outlet header and out of the conversion chamber. The closure means may be either automatically or manually operated in accordance with the pressure drop.

The outlet header, as positioned within the conversion chamber, occupies a substantial portion of the area which ordinarily would become a carbonized cone within the chamber. A layer of catalyst sufficiently thick to provide proper conversion is maintained over the top of the header. Regeneration of the catalyst material may generally be carried out by passing a pre-heated mixture of air and steam through the conversion chamber for a period of time sufficient to oxidize most of the carbonaceous deposits. When regeneration of the catalyst is started the regeneration materials tend to follow the same path as before. The regeneration will initially be uniform across the catalyst bed for a portion of its depth but will then progress more rapidly as it moves through the area at the periphery of the catalyst bed. It will be seen that the path followed along the outer periphery of the bed is considerably longer than that followed directly through the center of the bed. In that manner, though the deposition of carbonaceous material on the catalyst in the outer periphery of the bed may be lighter than that in the center, the regeneration of the catalyst bed is completed throughout the entire area in substantially the same amount of time. It will thus be seen that the regeneration step will put the catalyst bed into a substantially active state throughout its entire area and make possible more complete utilization of the conversion chamber for intimate contact with the reactant materials.

Other means than those described may be utilized to close the space between the inner and outer chamber at the bottom of the outer chamber. The entire header may be made as a unit and inserted into the bottom of a conversion chamber. In its construction the inner header chamber may be long enough so that when installed in a conversion chamber it will extend through the conversion chamber bottom or it may be only long enough to extend a portion of the way through. In the latter case a conduit may extend into the conversion chamber bottom to communicate with the inner chamber of the outlet header.

*Example*

A virgin gas oil is used as a charge stock to a catalytic cracking unit using an outlet header of this invention. The oil is fed to a preheater, at a temperature of about 305° F. and a pressure of about 265 p. s. i. g., where it is heated to a temperature of about 1040° F. and combined with approximately 30 pounds of steam per barrel of oil and the pressure is reduced to approximately 97 p. s. i. g. The preheated oil-steam mixture is passed to the top of a conversion chamber containing approximately 60,000 pounds of particulate bauxite catalyst of 4–16 mesh and is injected thereinto at a temperature of about 1020° F., and a pressure of about 85 p. s. i. g. at a rate of about 250 barrels per hour. The conversion products are removed from the bottom of the conversion chamber at a temperature of about 940° F. and a pressure of about 81 p. s. i. g. and are passed through a heat exchanger wherein the temperature of the conversion products is lowered to approximately 475° F. and at which temperature they are passed to a fractionator. When the pressure drop across the chamber increases to approximately 7 pounds, the closures in the outlets, from the outer chamber of the outlet header, are opened and the catalyst fines are blown from the header until the pressure drop through the chamber returns to about 4 pounds. When the catalyst reaches a point of substantial inactivity, or the deposition of carbonaceous materials thereon becomes so great as to be undesirable, the reactant feed is cut off, and air, at the rate of about 125,000 cubic feet per hour, together with about 30,000 pounds of steam per hour, is injected into the upper portion of the conversion chamber at a temperature of about 1100° F. and a pressure of approximately 95 p. s. i. g. In that manner the carbonaceous deposit is removed by oxidation and the steam acts to absorb heat from the exothermic oxidation reaction. The effluent is removed from the chamber at a temperature of approximately 1350° F. and a pressure of about 82 p. s. i. g. The regeneration is continued until the chamber effluent contains only about 2% carbon dioxide, at which time the air-steam mixture is cut off and reactant feed is turned into the chamber once again.

While this invention has been described with some particularity, it will be obvious to those skilled in the art that many modifications may be made without going beyond the scope and intent of this invention.

I claim:

1. An outlet header comprising in combination with a confined conversion chamber having a conically shaped bottom and containing a particulate solid catalyst; an outer header chamber resting upon said conversion chamber bottom and extending upwardly, coaxially with and into said conversion chamber and substantially into said catalyst; perforations dispersed over the area of said outer chamber, which perforations are slightly smaller than the sized particles of said catalyst; a cap affixed to and closing the top end of said outer chamber, perforations in said cap, which perforations are provided with a covering of heat resistant, fine mesh screen; an inner open end header chamber secured in and extending from said conical bottom of said conversion chamber and coaxially into said outer header chamber to a point nearly adjacent to said cap, being spaced, at its sides, from said outer chamber, by spacer means; perforations dispersed over the area of said inner chamber, which perforations increase in size from the top of said chamber to its bottom; a covering of fine mesh, heat resistant screen over said perforations; outlet means in said conical bottom of said conversion chamber, which means communicates between the space between said inner and outer header chambers and the exterior of said reaction chamber and which outlet means comprises a plurality of conduits; and closure means in said outlet means to control flow therethrough.

2. An outlet header comprising, in combination with a confined conversion chamber containing a particulate solid catalyst, an outer header chamber resting upon the bottom of said conversion chamber and extending upwardly, coaxially with and into said conversion chamber and substantially into said catalyst; perforations dispersed over the area of said outer chamber, which perforations are smaller than the sized particles of said catalyst; a cap affixed to and closing the top end of said outer chamber; perforations in said cap, which perforations are provided with a covering of heat resistant, fine mesh screen; an inner open end header chamber secured in and extending from the bottom of said conversion chamber and coaxially into said outer header chamber to a point nearly adjacent to said cap, being spaced, at its sides, from said outer chamber; perforations dispersed over the area of said inner chamber; a covering of fine mesh, heat resistant screen over said perforations; outlet means in the bottom of said conversion chamber, which means communicates between the space between said inner and outer header chambers and the exterior of said reaction chamber, and closure means in said outlet means to control flow therethrough.

3. An outlet header comprising, in combination with a confined conversion chamber containing a particulate solid catalyst, an outer header chamber resting upon the bottom of said conversion chamber and extending upwardly, coaxially with and into said conversion chamber and substantially into said catalyst; perforations dispersed over the area of said outer chamber, which perforations are smaller than the sized particles of said catalyst; a cap affixed to and closing the top end of said outer chamber; perforations in said cap, which perforations are provided with heat resistant filter means; an inner open end header chamber secured in and extending from the bottom of said conversion chamber and coaxially into said outer header chamber to a point nearly adjacent to said cap, being spaced, at its sides, from said outer chamber; perforations dispersed over the area of said inner chamber, said perforations being provided with heat resistant filter means; outlet means in the bottom of said conversion chamber, which means communicates between the space between said inner and outer header chambers and the exterior of said reaction chamber; and closure means in said outlet means to control flow therethrough.

4. An outlet header for a catalytic conversion chamber comprising in combination, an outer header chamber having perforations dispersed over its area; a perforate cap closing the top of said outer chamber, the perforations of said cap being provided with filter means; an inner open end header chamber extending coaxially into said outer chamber from outside said outer chamber to a point above said perforations therein and spaced from said outer chamber; perforations dispersed over the area of said inner chamber, which perforations are provided with filter means; first closure means between the bottom of said outer chamber and said inner chamber; outlet means in said first closure means, and second closure means in said outlet means to control flow therethrough.

5. An improved method for catalytically converting hydrocarbons which comprises the steps of injecting preheated hydrocarbon into a catalyst containing conversion zone; passing effluent materials from said conversion zone through a catalyst trapping zone and thence through a separation zone into an effluent collection zone, whereby catalyst fines carried into said trapping zone are substantially removed from said effluent materials; removing catalyst materials from said trapping zone in accordance with the pressure drop across said conversion zone, trapping zone, separation zone and collection zone; and removing effluent materials from said effluent collection zone.

6. An improved method for catalytically converting hydrocarbons which comprises the steps of injecting preheated hydrocarbon into a catalyst containing conversion zone, passing effluent materials from said conversion zone through a catalyst trapping zone and thence through a separation zone into an effluent collection zone, whereby catalyst fines carried into said trapping zone are substantially removed from said effluent materials; blowing catalyst materials from said trapping zone in accordance with the pressure drop across said conversion zone, trapping zone, separation zone and collection zone; and removing effluent materials from said effluent collection zone.

7. An outlet header comprising, in combination with a confined chamber containing a particulate solid catalyst, an outer perforate header chamber supported coaxially in the lower portion of said conversion chamber, said perforations being dispersed over the area of said outer chamber and being smaller than the sized particles of said catalyst; a perforate cap affixed to and closing the top end of said outer chamber; heat resistant filter means covering said perforate portion of said cap; an inner perforate open end header chamber communicating through said outer chamber between the exterior of said conversion chamber and a point adjacent said cap and being spaced at its sides from said outer chamber; heat resistant filter means covering said perforate portion of said inner chamber; closure means closing the lower portion of the space between said inner and outer chambers; outlet means in the bottom of said conversion chamber, which outlet means communicates between the space between said inner and outer header chambers and the exterior of said reaction chamber; and closure means in said outlet means to control flow therethrough.

8. The outlet header of claim 7, wherein said perforations in said inner chamber are progressively larger in diameters from the upper to the lower portion of said chamber.

9. An improved method for catalytically converting hydrocarbons which comprises the steps of injecting preheated reactant materials into the upper portion of a catalyst containing conversion zone; passing said reactant materials downwardly and inwardly through said catalyst, whereby conversion of said reactant materials is accomplished; passing effluent materials from said conversion zone through a catalyst trapping zone and thence through a separation zone into an effluent collection zone, whereby catalyst fines entrained in said effluent stream are separated from said effluent stream in said separation zone and are retained in said trapping zone; opening said trapping zone to the atmosphere upon pressure drop across said conversion, trapping, separation and collection zones reaching a predetermined maximum, whereby said trapped catalyst fines are blown from said trapping zone by effluent materials from said conversion zones; closing said trapping zone to the atmosphere upon pressure drop across said conversion, trapping, separation and collection zones reaching a predetermined minimum; and removing catalyst freed effluent materials from said effluent collection zone.

ALFRED E. MORREY, JR.

REFERENCES CITED

The following references are of record in the file of this patent:

UNITED STATES PATENTS

| Number | Name | Date |
|---|---|---|
| 2,212,583 | Broderson et al. | Aug. 27, 1940 |
| 2,315,208 | Kinnaird | Mar. 30, 1943 |
| 2,319,620 | Mather | May 18, 1943 |